(12) United States Patent
Frields et al.

(10) Patent No.: US 8,990,813 B2
(45) Date of Patent: Mar. 24, 2015

(54) AUTOMATED VIRTUAL MACHINE IMAGE DEPLOYMENT AND TESTING BY ACCESSING DOWNLOADABLE TEST PACKAGES AND DYNAMICALLY-CHANGING TEST PARAMETERS

(75) Inventors: Paul W. Frields, Fredericksburg, VA (US); Mike McGrath, Schaumburg, IL (US); James Laska, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 779 days.

(21) Appl. No.: 12/749,274

(22) Filed: Mar. 29, 2010

(65) Prior Publication Data

US 2011/0239214 A1    Sep. 29, 2011

(51) Int. Cl.
G06F 11/26 (2006.01)
G06F 11/27 (2006.01)
G06F 11/36 (2006.01)
G06F 9/455 (2006.01)

(52) U.S. Cl.
CPC ........ G06F 9/45533 (2013.01); G06F 11/3672 (2013.01)
USPC ............... 718/100; 718/1; 717/168; 717/124; 714/38.1; 714/38.14; 709/223; 709/226

(58) Field of Classification Search
None
See application file for complete search history.

(56) References Cited

U.S. PATENT DOCUMENTS

| | | | | |
|---|---|---|---|---|
| 6,662,312 B1 * | 12/2003 | Keller et al. | ............... | 714/38.14 |
| 2003/0236927 A1 * | 12/2003 | Cleraux et al. | ................ | 709/331 |
| 2007/0006036 A1 * | 1/2007 | Devas et al. | .................... | 714/38 |
| 2007/0168970 A1 * | 7/2007 | Li et al. | .......................... | 717/124 |
| 2007/0214390 A1 * | 9/2007 | Liu et al. | .......................... | 714/33 |
| 2007/0234293 A1 * | 10/2007 | Noller et al. | .................... | 717/124 |
| 2007/0283314 A1 * | 12/2007 | Browning et al. | ............ | 717/100 |
| 2008/0163194 A1 * | 7/2008 | Dias et al. | ...................... | 717/174 |
| 2008/0244525 A1 * | 10/2008 | Khalil et al. | ................... | 717/124 |
| 2008/0244579 A1 * | 10/2008 | Muller | ........................... | 718/100 |
| 2008/0271017 A1 * | 10/2008 | Herington | .......................... | 718/1 |
| 2009/0013162 A1 * | 1/2009 | Nandan et al. | ..................... | 713/1 |
| 2009/0100420 A1 * | 4/2009 | Sapuntzakis et al. | .......... | 717/171 |
| 2009/0282404 A1 * | 11/2009 | Khandekar et al. | ............... | 718/1 |
| 2009/0307763 A1 * | 12/2009 | Rawlins et al. | .................... | 726/5 |
| 2010/0100880 A1 * | 4/2010 | Shigeta et al. | ..................... | 718/1 |
| 2010/0125667 A1 * | 5/2010 | Soundararajan | .............. | 709/227 |
| 2010/0293146 A1 * | 11/2010 | Bonnet et al. | ................. | 707/640 |
| 2010/0313185 A1 * | 12/2010 | Gupta et al. | ................... | 717/124 |
| 2011/0010691 A1 * | 1/2011 | Lu et al. | .......................... | 717/124 |
| 2011/0010710 A1 * | 1/2011 | Thrush et al. | ...................... | 718/1 |
| 2011/0083122 A1 * | 4/2011 | Chen et al. | ..................... | 717/124 |

OTHER PUBLICATIONS

Test Farm (Community Group testing.testfarm)—XWiki, Mar. 29, 2010, pp. 1-5.

* cited by examiner

*Primary Examiner* — Emerson Puente
*Assistant Examiner* — Benjamin Wu
(74) *Attorney, Agent, or Firm* — Lowenstein Sandler LLP

(57) ABSTRACT

A mechanism for utilizing a virtual machine cloud for automated test system deployment is disclosed. A method of embodiments of the invention includes selecting a master image used to initialize one or more virtual machines (VMs), providing a list of repository definitions and test packages to the one or more VMs, and receiving test results from executing the test packages on a computer system of the VM defined by the master image, wherein the computer system includes an operating system and one or more software applications.

20 Claims, 4 Drawing Sheets

200

Request an operating environment for initialization on one or more VMs, as well as test package(s) to be run on that computer system
210

Receive specific information corresponding to the chosen operating environment, such as operating system and software applications, from a host controller initializing the one or more VMs
220

Identify master image and test packages corresponding to the operating environment and tests to be provided to the one or more VMs
230

Communicate with a VM management component to initialize the one or more VMs to run the selected computer system by providing the identified master image to each of the one or more VMs
240

Set off testing in VMs by providing list of repository definitions and identified test packages to each of the one or more VMs
250

Receive test results from VMs
260

Fig. 2

AUTOMATED VIRTUAL MACHINE IMAGE DEPLOYMENT AND TESTING BY ACCESSING DOWNLOADABLE TEST PACKAGES AND DYNAMICALLY-CHANGING TEST PARAMETERS

TECHNICAL FIELD

The embodiments of the invention relate generally to testing environments and, more specifically, relate to utilizing a virtual machine cloud for automated test system deployment.

BACKGROUND

It is important for all computing systems and packages to be tested for potential problems and failures. Typically, computing systems and their packages can fail in a few ways. One way is standard code bugs. Another way is failure to detect or deal with specific hardware configurations. Currently, most computing systems and packages are tested on a set number of physical systems that are dedicated to the tasks of executing tests and reporting back any errors encountered. These physical systems are bound by the limits of their resources. Also, the physical systems require much manual intervention to set-up the testing environment and oversee their day-to-day running.

On the other hand, a virtualized test farm could be implemented to perform the tasks of the physical test systems described above. A virtualized test farm is not bound by the limitations of the present physical system, but rather is bound by the limits of its virtual systems, such as memory. Unfortunately, a virtualized test farm would be hard pressed to expose the second kind of problem of detecting problems resulting from specific hardware configurations because typically the point of virtualization is to abstract away, or remove, the differences between hardware.

As such, a mechanism to utilize a virtualization system to perform both non-functional and functional testing of computing systems and packages would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 2 is a flow diagram illustrating a method performed by a testing management console for utilizing a virtual machine cloud for automated test system deployment according to an embodiment of the invention;

DETAILED DESCRIPTION

Figure 1:
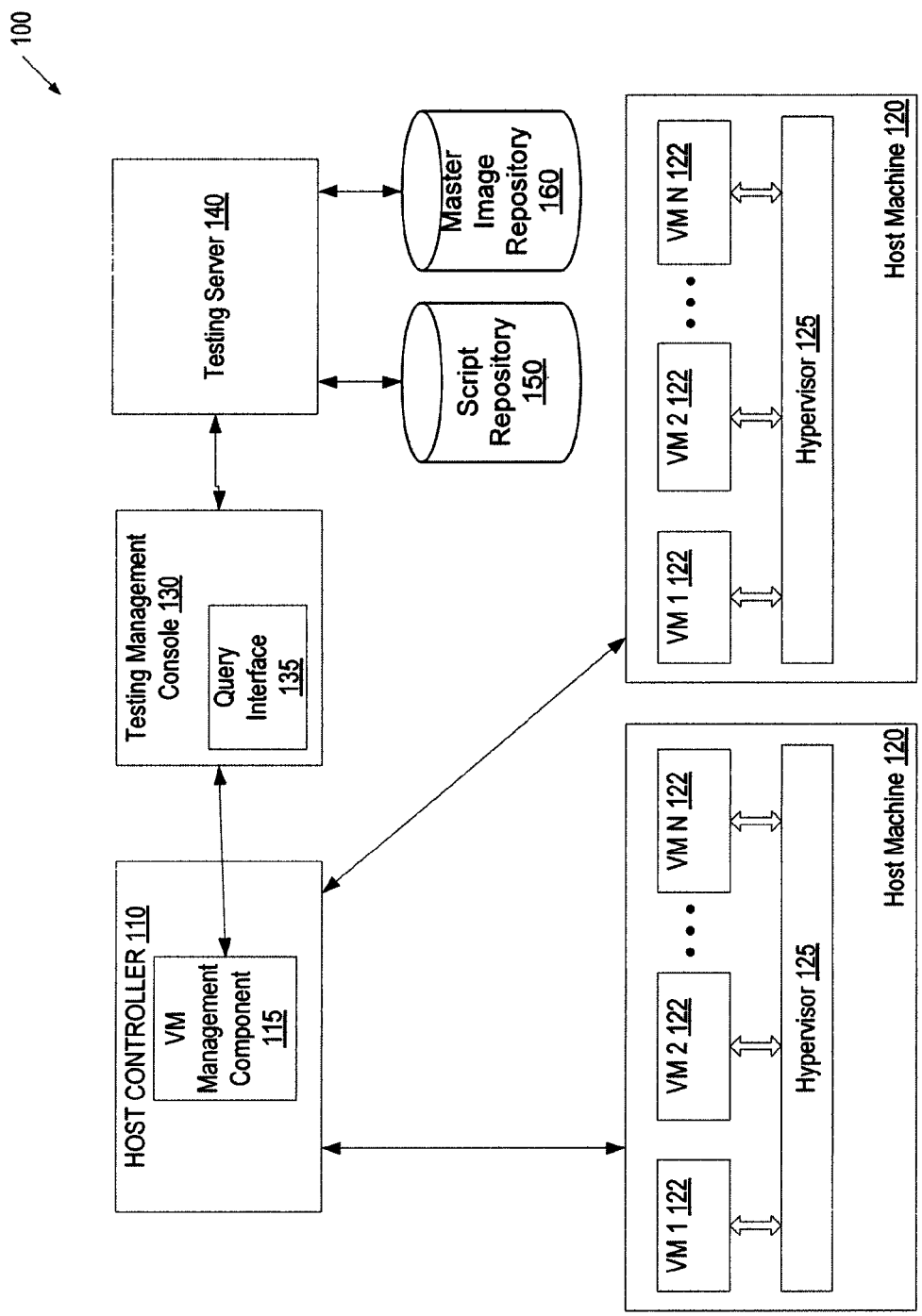
FIG. 1 is a block diagram of a virtualization system used for functional testing of computing systems and packages according to an embodiment of the invention.

Embodiments of the invention provide a mechanism for utilizing a virtual machine cloud for automated test system deployment. A method of embodiments of the invention includes selecting a master image used to initialize one or more virtual machines (VMs), providing a list of repository definitions and test packages to the one or more VMs, and receiving test results from executing the test packages on a computer system of the VM defined by the master image, wherein the computer system includes an operating system and one or more software applications.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for utilizing a virtual machine cloud for automated test system deployment. Embodiments of the invention combine the use of VMs in a virtual test farm with other pre-existing software and technologies to form a functional testing system, one that could find regressions in existing software using various hardware configurations on a regular basis. In other words, embodiments of the invention apply a cloud model to higher-level functional testing by replacing physical hardware of the functional testing environment with the cloud model.

A cloud model refers to technique of making use of virtualization so that rather than relying on a large set of physical hardware that are manually managed (physically available to the end user in some sense), the abstraction of a VM is implemented (could be running in some remote location on hardware not owned by an end user) to handle the functionality of the previous physical hardware. VMs generally present an interface that looks like a common, well-supported, well-understood set of hardware to the operating system, making them not very useful for finding hardware configuration-related bugs. However, embodiments of the invention provide VMs that are meant to be managed in a larger testing console, so that exemplary images or snapshots of a working system are available to use with the VMs. In addition, the testing console provides a battery of tests that can be run by the VMs, under the direction of the testing console to provide the higher-level functional testing capability.

FIG. 1 is a block diagram of a virtualization system 100 used for functional testing of computing systems and packages according to an embodiment of the invention. The virtualization system 100 may include a host controller 110 that manages one or more host machines 120. The one or more host machines 120, in turn, run one or more virtual machines (VMs) 122.

Each VM 122 runs a guest operating system (OS) that may be different from one another. The guest OS may include Microsoft Windows, Linux, Solaris, Mac OS, etc. The host machine 120 may include a hypervisor 125 that emulates the underlying hardware platform for the VMs 122. The hypervisor 125 may also be known as a virtual machine monitor (VMM), a kernel-based hypervisor or a host operating system.

In one embodiment, each VM 122 may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 120 as a local client. In one scenario, the VM 122 provides a virtual desktop for the client.

As illustrated, the host machines 120 may be coupled to the host controller 110 (via a network or directly). In some embodiments, the host controller 110 may reside on a designated computer system (e.g., a server computer, a desktop computer, etc.) or be part of the host machine 120 or another machine. The VMs 122 can be managed by the host controller 110, which may add a VM, delete a VM, balance the load on the server cluster, provide directory service to the VMs 122, and perform other management functions.

In embodiments of the invention, the host controller 110 is communicably coupled to a testing management console 130. The testing management console 130 is configured to manage a testing process that utilizes a plurality of VMs 122 to implement the testing. In embodiments of the invention, testing management console 130 allows an administrator to select "master images" that are provided to host machines 120 for use in the initialization of VMs 120 on the host machines 120. The testing management console 130 communicates with a VM management component 115 on host controller 110 in order to communicate with host machines 120 and provide the master images and other data related to the testing environment to the host machines 120 and their respective VMs 122. In one embodiment, testing management console 130 may be presented as a web-based management application programming interface (API). For example, testing management console 130 may provide a query interface 135 that would allow queue, status, and results information to be consumed elsewhere other than at the testing management console 130, such as at other web applications.

The testing management console 130 is, in turn, communicably coupled to a testing server 140 that provides access to one or more master images and one or more scripts that are each utilized by the VMs 122 in the testing environment. In some embodiments, the master images may be stored in a master image repository 160 connected to the testing server 140, and the scripts may be stored in a script repository 150 connected to the testing server 140.

As mentioned above, in embodiments of the invention, the "master images" provide a base computer system image to be installed on a VM 122. Master images are base images used to establish a VM that represents a disc state for a machine that has been installed. The master image is a copy of an installed system including all of its various files and some selection of software that also comes with it. There may be various master images that are used for each release of a particular system. For example, there may be a master image stored in the master image repository 160 for a specific installation of a Fedora release, which is a Linux distribution released every 6 months. There could also be multiple master images for the same core system, but with a variety of different sets of software to select from. The testing management console 130 may request a particular master image from the testing server 140 in order to set up functional testing of the most basic components of particular system (e.g., kernel, testing I/Os). On the other hand, some master images may be requested because they set up as a particular environment, such as a database server or a typical end user's graphical desktop environment (e.g., to test more of user-productivity level components).

In embodiments of the invention, the testing management console also provides each VM 122 initialized with a master image one or more partly or fully-automated scripts in order to set off a testing framework at that VM 122. A test framework may encompass any sort of imaginable testing that could be performed on any of the master images. For example, one test framework may expose graphical elements in the VM system so that interactions can be scripted with these graphical elements that are mostly indistinguishable from an end user causing the interaction (e.g., mouse moving over a button and clicking it, etc.) in order to mimic human interactions to measure the results of such interaction. In one embodiment, the precise nature of the number of tests, the kinds of tests that run, and what level of testing (low-level code paths vs. high-level user interactivity) occurs are determined by the administrator of test system.

When the testing management console 140 determines the tests it should run on each master image, it requests the required scripts from the testing server 140, which in turn retrieves the scripts from the script repository 150. The testing management console 130 provides, via the VM management component 115, the executable portion of the test as the particular script to each VM 122 selected to run the particular test. The VM management component 115 ensures that each VM 122 that will be performing testing is properly prepared for the test. For example, the VM management component 115 checks that each VM 122 has the commands that it will be running and is in pristine condition (i.e., freshly built from some known base install and has not been tampered with).

Packages for the VM 122 would be provided out of a repository of test suites 150. The repository 150 may have packages of tests for a specific facility or specific capability, and those packages would be wrapped in higher-level meta-packages representing a test suite that is deployable on the master image. For example, assume that there is a large number of various test packages out there all of which concern the text editor. Then, there is a higher-level meta-package that essentially installs all of the packages for the text editor. Similarly, there is no limit to the number of levels to which those meta-packages can be abstracted (e.g., the text editor package could be wrapped into a meta-package for an office suite, and so on). In other embodiments, the repository 150 may store tests in any form, such as packages, .zip files, .jar files, and so on. One skilled in the art will appreciate that embodiments of the invention are not limited solely to test packages.

In some embodiments, after initial setup, the testing management console 130 automates the provisioning of VMs, deployment of tests, and running and reporting of tests by setting parameters for which tests to run on with which master images, as well as the number of VMs to utilize and when the tests are run. For automation purposes, the testing management console 130 may have some trigger values where if resources are determined to be insufficient, then the testing management console 130 will report back an error saying resources are low and the reason why.

Embodiments of the invention make all of the tests for testing environment easily deployable on one or more master images via scripts, without having to put all of the various testing combinations in every master image. If each combination did have to be provided in each master image an unmanageable and inefficient number of master images would result. Instead the testing combinations are abstracted from the system combinations resulting in a streamlined and efficient testing system with practically unlimited resources via deployment on VMs 122.

FIG. 2 is a flow diagram illustrating a method 200 performed by a testing management console for utilizing a virtual machine cloud for automated test system deployment according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by testing management console 130 of FIG. 1.

Method 200 begins at block 210 where a testing management console requests an operating environment to be initialized on one or more VMs. In one embodiment, this operating environment includes a computer system having an OS and software applications running on the OS. In addition, one or more tests are selected to run against the chosen computer system. A host controller of the one or more VMs would be responsible for providing this operating environment and returning specifics to the testing management console about the environment is enabled when it is available at block 220. At block 230, the testing management console would then identify the corresponding master image and test packages stored by a testing server to be provided to one or more VMs that will emulate the selected computer system and execute the selected test packages.

Subsequently, at block 240, the testing management console communicates with a VM management component to begin initialization of the one or more VMs with the determined computer system. In one embodiment, the testing management console provides, via the VM management component, the identified master image to be used to initialize the one or more VMs. Then, at block 250, testing in the one or more VMs is set off by providing, via the VM management component, the list of repository definitions and identified test packages to each of the one or more VMs. In addition, the testing management console also provides any post-scripting that is necessary to install the test packages and any post-booting instructions needed for the VMs to perform the necessary tests and report results back to the testing management console. Lastly, at block 260, the testing management console receives any reported test results from the one or more VMs.

Figure 3:
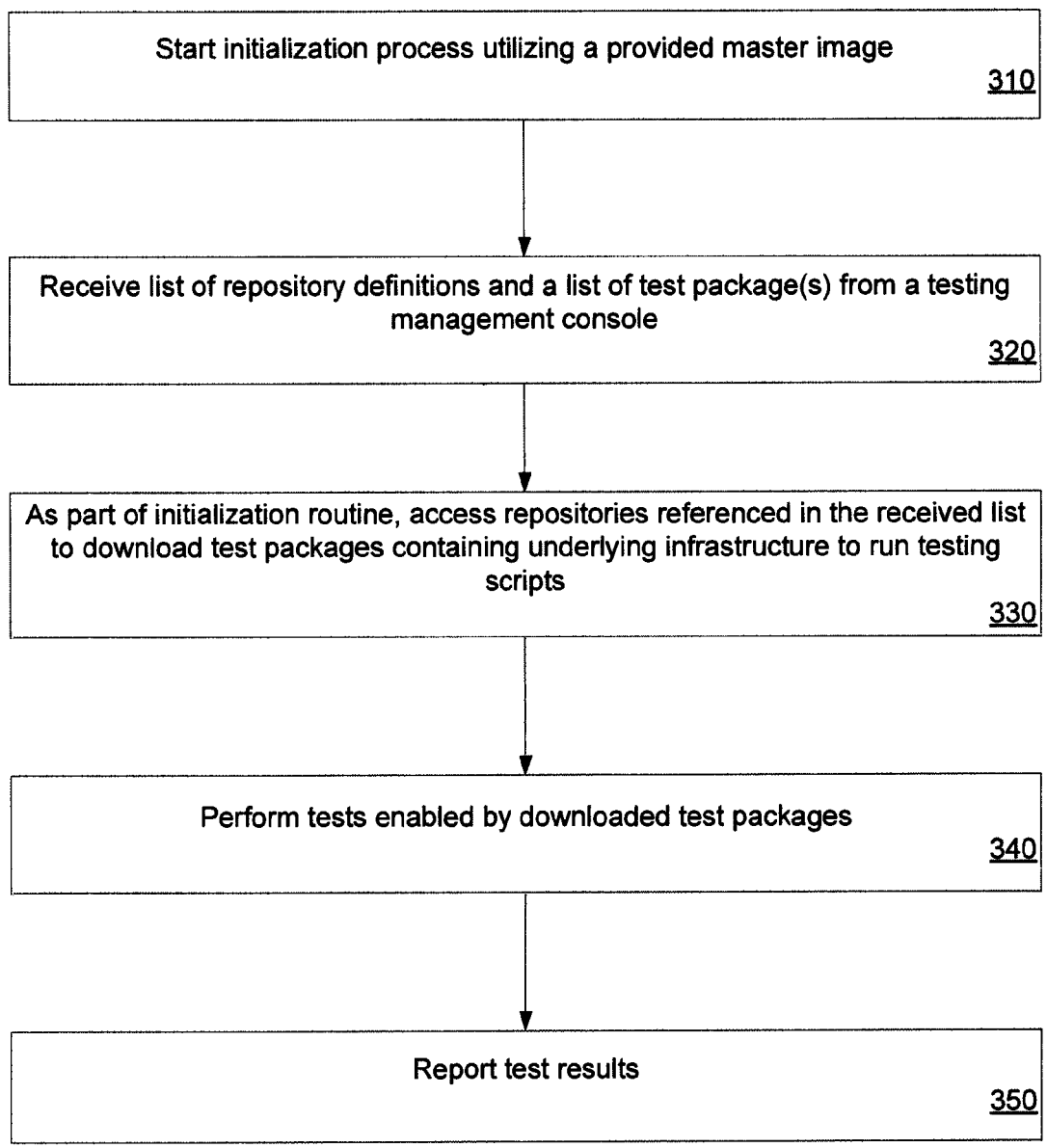
FIG. 3 is a flow diagram illustrating a method performed by a host machine for utilizing a virtual machine cloud for automated test system deployment according to an embodiment of the invention.

FIG. 3 is a flow diagram illustrating a method 300 performed by a host machine for utilizing a virtual machine cloud for automated test system deployment according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by VM 122 of FIG. 1.

Method 300 begins at block 310 where a VM begins an initialization process by utilizing a master image provided by a testing management console to implement a particular computer system, including an OS and software applications. Then, at block 320, the VM further receives a list of repository definitions and a list of test package(s) from the testing management console. The list of repository definitions tells the VM where to find the repositories that store the test packages.

At block 330, the VM accesses the repositories references in the received list in order to download the test packages. In one embodiment, this access occurs upon restart of the VM post-installation. The test packages contain the underlying infrastructure needed to run testing scripts on the VM. Subsequently, at block 340, the VM performs the tests that are enabled by the downloaded test packages. In some embodiments, the test packages themselves may direct the VMs to grab a dynamically changing set of test and parameters in some non-packaged form. In some cases, the test packages may tell the VM to consult another source, such as the results of a web-based query for parameters or instructions that may be changing too rapidly to package efficiently. Lastly, at block 350, the VM reports the test results back to the testing management console. In one embodiment, metadata provided with the test packages lets the VM know where to report its testing results. For example, each test package may have a name and metadata with it that could include one or more emails for contacts to inform of the testing results.

Figure 4:
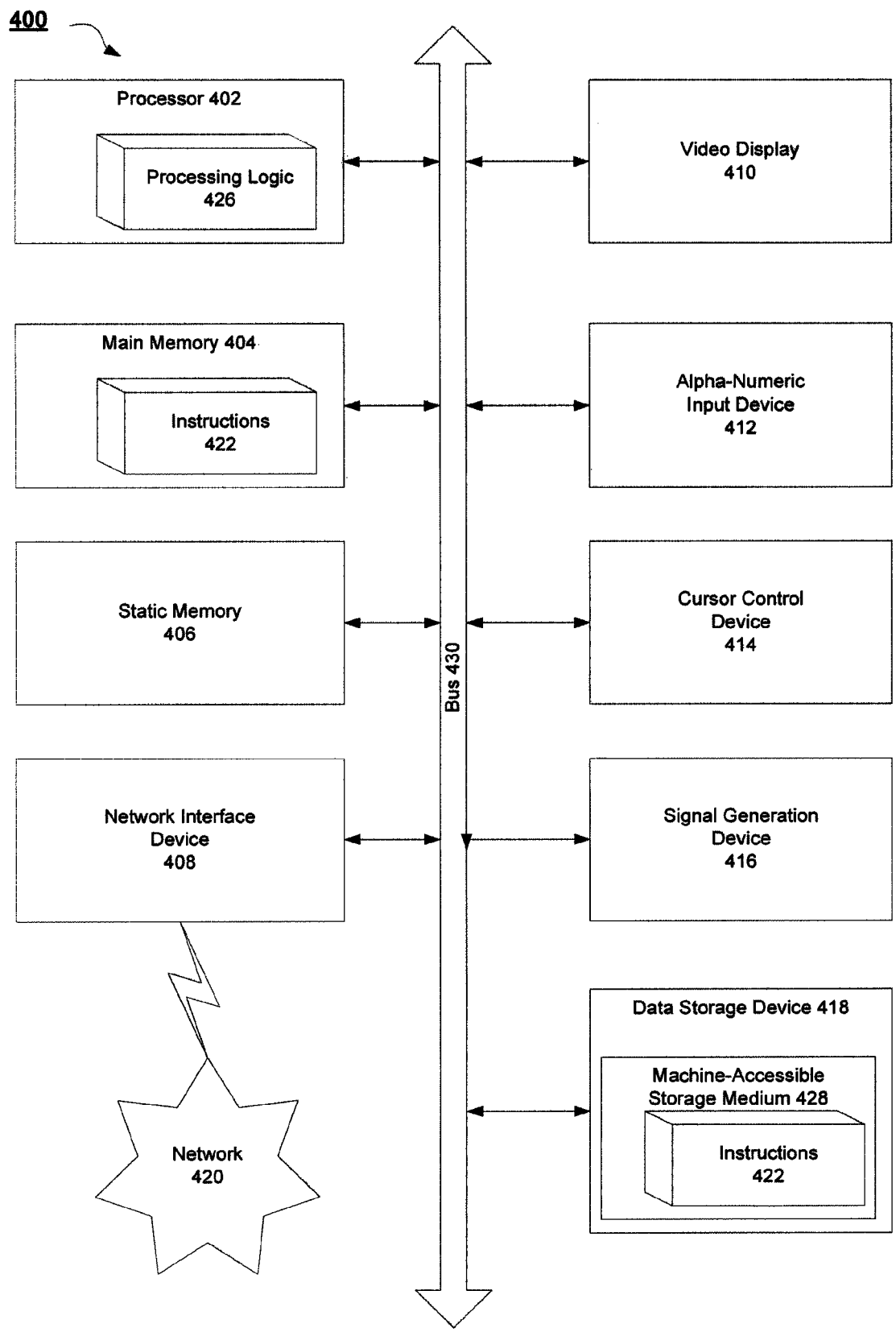
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform utilizing a virtual machine cloud for automated test system deployment by virtualization system 100 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform utilizing a virtual machine cloud for automated test system deployment of methods 200 and 300 described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    configuring parameters in a testing management console executed by a processing device, the parameters to identify:
        test packages to be executed against master images;
        virtual machines (VMs) to execute the master images and the test packages; and
        time periods for the testing management console to provide a master image of the master images and to provide a list of repository definitions and the test packages corresponding to the master image;
    providing, by the testing management console per the configured parameters without user interaction, the master image to initialize a VM of the VMs, wherein the VM comprises a computing system to be tested;
    providing, by the testing management console to the VM per the configured parameters without user interaction, the list of repository definitions and the test packages corresponding to the master image, wherein the VM to download the test packages from repositories identified in the list repository definitions in order to execute the test packages on the computing system of the VM, and wherein at least one of the test packages instruct the VM to consult, during execution of tests enabled by the test packages, another source to obtain dynamically changing parameters, wherein the another source comprises at least results of a web-based query for the dynamically changing parameters; and
    receiving, by the testing management console, test results from executing the tests on the computing system of the VM.

2. The method of claim 1, wherein the master image is a copy of the computer system comprising all files of the computer system and a selection of software applications executable on an operating system of the computer system.

3. The method of claim 1, wherein the master image and the test packages are stored in a repository managed by a testing server communicably coupled to the testing management console.

4. The method of claim 1, further comprising automating the providing the master image and the providing the list of repository definitions and the tests at the testing management console by performing the configuring the parameters in the testing management console.

5. The method of claim 1, wherein the VM utilizes the list of repository definitions to download the test packages for installation on the VM.

6. The method of claim 1, wherein the test packages comprise one or more of zip files, jar files, or test scripts.

7. The method of claim 6, wherein the VM executes the test scripts in order to run one or more test packages on the computing system of the VM.

8. The method of claim 1, wherein the testing management console comprises a query interface that allows at least one of queue, status, or result information associated with the test packages to be consumed outside of the testing management console.

9. A system, comprising:
a memory;
a processing device communicably coupled to the memory;
a testing management console executable from the memory by the processing device and communicably coupled to the repository, the testing management console to:
configure parameters in the testing management console, the parameters to identify:
test packages to be executed against master images;
virtual machines (VMs) to execute the master images and the test packages; and
time periods for the testing management console to provide a master image of the master images and to provide a list of repository definitions and the test packages corresponding to the master image;
provide, per the configured parameters without user interaction, the master image to initialize a VM of the VMs, wherein the VM comprises a computing system to be tested;
provide, to the VM per the configured parameters without user interaction, the list of repository definitions and the test packages corresponding to the master image, wherein the VM to download the test packages from repositories identified in the list of repository definitions in order to execute the test packages on the computing system of the VM, and wherein at least one of the test packages instruct the VM to consult, during execution of tests enabled by the test packages, another source to obtain dynamically changing parameters, wherein the another source comprises at least results of a web-based query for the dynamically changing parameters; and
receiving, by the testing management console, test results from executing the tests on the computing system of the VM.

10. The system of claim 9, wherein the master image is a copy of the computer system comprising all files of the computer system and a selection of software applications executable on an operating system of the computer system.

11. The system of claim 9, wherein the test packages comprise one or more of zip files, jar files, or test scripts.

12. The system of claim 11, wherein the VM executes the test scripts in order to run the test packages on the computing system of the VM.

13. The system of claim 9, wherein the testing management console further to automate the providing the master image and the providing the list of repository definitions and the tests at the testing management console by performing the configuring the parameters in the testing management console.

14. The system of claim 9, wherein the VM utilizes the list of repository definitions to download the test packages for installation on the VM.

15. The system of claim 9, wherein the testing management console comprises a query interface that allows at least one of queue, status, or result information associated with the test packages to be consumed outside of the testing management console.

16. A non-transitory machine-readable storage medium including instructions that, when accessed by a processing device, cause the processing device to perform operations comprising:
configuring parameters in a testing management console executed by the processing device, the parameters to identify:
test packages to be executed against master images;
virtual machines (VMs) to execute the master images and the test packages; and
time periods for the testing management console to provide a master image of the master images and to provide a list of repository definitions and the test packages corresponding to the master image;
providing, by the testing management console per the configured parameters without user interaction, the master image to initialize a VM of the VMs, wherein the VM comprises a computing system to be tested;
providing, by the testing management console to the VM per the configured parameters without user interaction, the list of repository definitions and the test packages corresponding to the master image, wherein the VM to download the test packages from repositories identified in the list of repository definitions in order to execute the test packages on the computing system of the VM, and wherein at least one of the test packages instruct the VM to consult, during execution of tests enabled by the test packages, another source to obtain dynamically changing parameters, wherein the another source comprises at least results of a web-based query for the dynamically changing parameters; and
receiving, by the testing management console, test results from executing the tests on the computing system of the VM.

17. The non-transitory machine-readable storage medium of claim 16, wherein the master image is a copy of the computer system comprising all files of the computer system and a selection of software applications executable on an operating system of the computer system.

18. The non-transitory machine-readable storage medium of claim 16, wherein each of the repositories stores a plurality of master images defining a plurality of installed systems and tests defining a plurality of test frameworks.

19. The non-transitory machine-readable storage medium of claim 16, wherein the machine-readable storage medium includes instructions to perform operations further comprising automating the providing the master image and the providing the list of repository definitions and the tests at the testing management console by performing the configuring the parameters in the testing management console.

20. The non-transitory machine-readable storage medium of claim 16, wherein the machine-readable storage medium includes instructions to perform operations further comprising providing a testing management console that comprises a query interface that allows at least one of queue, status, or result information associated with the test packages to be consumed outside of the testing management console.

* * * * *